Patented Oct. 2, 1928.

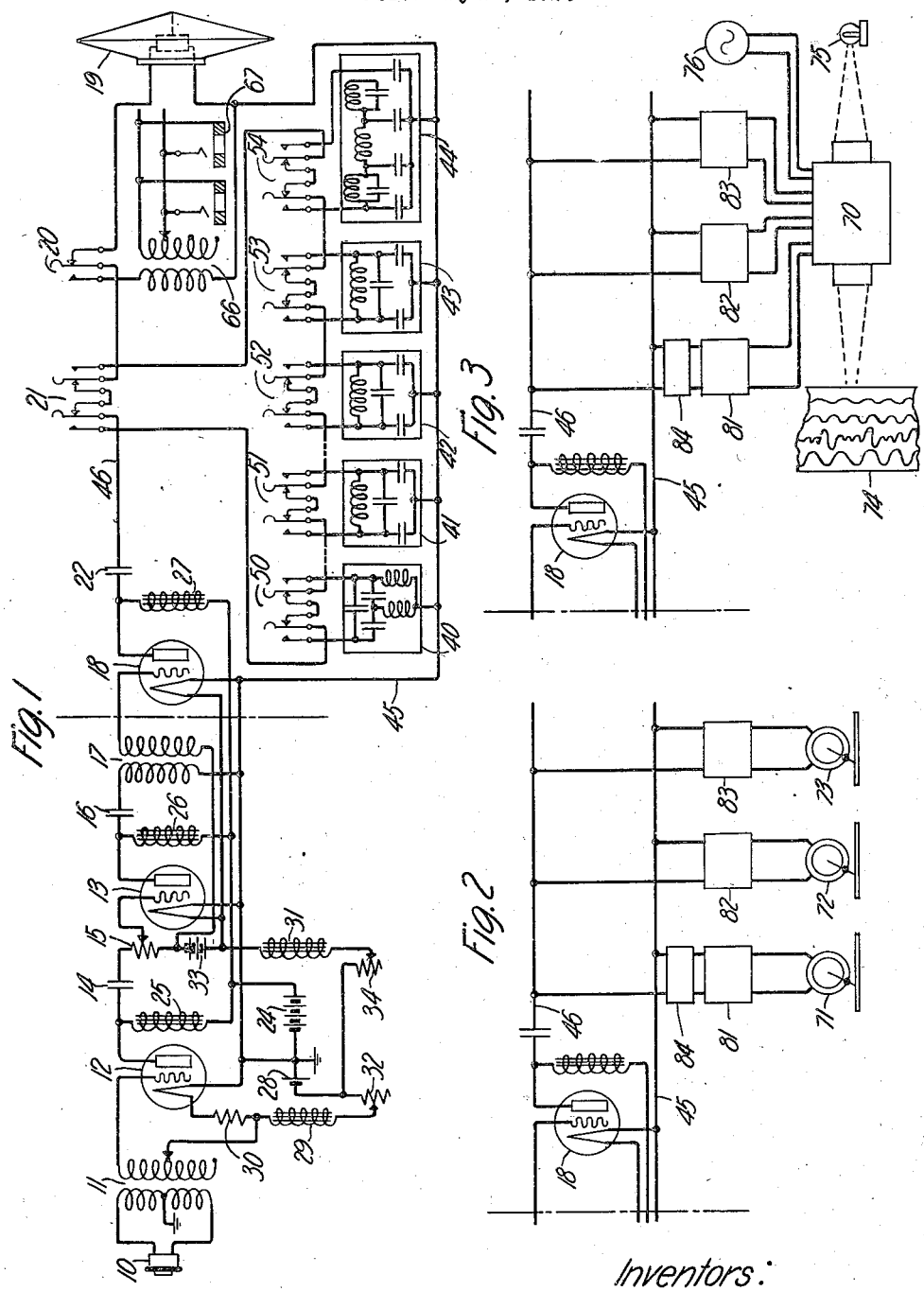

1,686,504

UNITED STATES PATENT OFFICE.

HAROLD F. DODGE, OF NEW YORK, N. Y., AND HALSEY A. FREDERICK, OF MOUNTAIN LAKES, NEW JERSEY, ASSIGNORS TO WESTERN ELECTRIC COMPANY, INCORPORATED, OF NEW YORK, N. Y., A CORPORATION OF NEW YORK.

STETHOSCOPIC APPARATUS.

Application filed May 29, 1924. Serial No. 716,624.

This invention relates to stethoscopes and particularly to electrical stethoscopes.

The object of the invention is to provide stethoscopic apparatus for faithfully and efficiently reproducing sound vibrations originating within the body.

In accordance with the general features of the invention there is provided in an electrical stethoscope adjustable means whereby any sound vibrations within the body within a limited frequency range may be selected for observation to the exclusion of all sounds outside of that frequency range.

In its preferred form there is provided an electromagnetic device for detecting and translating into electrical vibrations all sounds originating within the body particularly those produced within the cardiac and respiratory systems; a substantially distortionless amplifier for amplifying the electrical vibrations to render them readily observable either aurally or visually by a suitable translating device; and a series of low pass and high pass filters disposed between the amplifier and the translating device for passing only vibrations of such frequencies as it is desired to observe, thereby eliminating substantially all other vibrations including any induced or generated in the amplifier as well as external noises, picked up or generated by the electromagnetic detecting device.

Referring to the drawing, Fig. 1 shows diagrammatically stethoscopic apparatus embodying the invention, and Figs. 2 and 3 show modifications of the invention.

A detector 10, preferably of the type described in Patent No. 1,658,327 issued February 7, 1928 to H. F. Dodge, is connected to the primary of a transformer 11, the secondary of which is connected to the input of a vacuum tube 12. Taps are provided on the secondary of the transformer 11 for the purpose of controlling the voltage delivered to the grid circuit of the tube 12. The output of the tube 12 is connected to the input of the tube 13 through a condenser 14 and a potentiometer 15 which controls the voltage input to the tube 13. The output of the tube 13 is connected through a condenser 16 to the primary of a transformer 17, the secondary of which is connected to the input of a tube 18. A high impedance translating device 19 such as a loud speaking receiver, or a telephone head set, may be connected through switches 20 and 21 to the output of the tube 18. The plate potential of the tubes 12, 13, 18 is supplied by a battery 24 connected to their plates through impedances 25, 26 and 27 respectively. Filament current is supplied to all tubes by a battery 28, the negative side of which is connected to the filament of the tube 12 through the impedance 29, an adjustable resistance 32 and the resistance 30 and to the tubes 13 and 18 through an impedance 31 and an adjustable resistance 34. The positive side of the battery 28 is directly connected to all filaments. The drop in potential across the resistance 30 provides a negative bias for the grid of tube 12 and a battery 33 provides the negative bias for tubes 13 and 18, being connected to the tube 13 through the potentiometer 15 and to the grid of the tube 18 through the secondary of the transformer 17. The positive side of the battery 33 is connected to the negative side of the filaments of the tubes 13 and 18.

A series of low pass and high pass wave filters 40 to 44, inclusive, having different frequency characteristics, are adapted to be connected in circuit between the tube 18 and the translating device 19. For this purpose the filters are provided with switches 50 to 54, inclusive, by means of which one or any combination of the filters may be connected in circuit between the tube 18 and translating device 19 through the master switch 21. As shown the switches are all in their normal positions and all filters are disconnected. If, for example, switches 21, 50 and 54 are operated the filters 40 and 44 will be connected in circuit in tandem through the off-normal contacts of switches 21, 50 and 54 and the normal contacts of switches 51, 52 and 53 thereby providing a combination which will pass a predetermined range or band of frequencies and attenuating all frequencies outside of that range or band. By means of the switch 21 the filters may be connected or disconnected without destroying the set up once it has been made for a particular observation. Any suitable type of wave filter may be used such as those described in Patent 1,227,113, issued May 22, 1917 to G. A. Campbell and in an article by Otto J. Zobel in the Bell System Technical Journal for January 1923, pp. 1–46.

For the sake of illustration, five wave filters have been shown having cut-off frequencies which have been found convenient in actual practice. Filter 40 is a high pass filter with a cut-off frequency of 130 cycles. This means that this filter will freely pass currents of all frequencies higher than 130 cycles and will suppress currents of all frequencies lower than that value. Filters 41, 42, 43, and 44 are low pass filters having respectively cut-off frequencies of 1100, 650, 400 and 95 cycles, that is, they pass currents of frequencies lower than these respective values, but suppress currents of higher frequencies.

With this filter arrangement several bands of frequencies may be selected quickly and conveniently as may be desired. For example, with filters 40 and 42 in circuit a band extending from 130 to 650 cycles is selected. With filters 40 and 41 in circuit a band extending from 130 cycles to 1100 cycles is selected. With 44 in circuit alone only frequencies below 95 cycles are passed, these representing principally the normal heart sounds. When filter 40 is placed in the circuit, the relatively loud normal heart sounds are greatly subdued so that the higher pitched murmurs, râles and the like which are usually much fainter can be amplified to the desired extent and thus reduce the masking effect of the lower pitched sounds. It is obvious that a greater number of filters than shown may be used and any desired cut-off frequencies assigned to them. The number of filters used will depend upon the selectivity required. For research and special work, the range should be such that combinations may be set up to pass currents of any desired range of frequencies from the lower limit of audition up to about 1500 cycles, which is about the highest frequency of the vibrations of interest in auscultation and suppress all others. For general purposes it may be sufficient to provide a range of filters which partially suppress the vibrations of no interest so that the vibrations of interest may be more readily observed. By interposing the filters between the amplifiers and the translating device, it is not only possible to suppress any of the body vibrations detected by the detector 10 that are not of interest as well as any extraneous noises picked up by the detector, but also any vibrations induced or generated in the circuit. It is, therefore, possible to readily observe the faint sounds, the detection of which would otherwise be practically impossible.

When a plurality of translating devices are used it is preferable to connect them to the output circuit through a suitable transformer 66, the secondary of which is connected to a plurality of jacks 67 to which, for example, one or any number of head telephone receivers may be connected. The secondary of the transformer 66 is preferably tapped so that it may be adjusted to suit the load.

Fig. 2 shows a plurality of sound recording devices 71, 72, 73 connected in multiple through groups of filters 81, 82 and 83 with their switches to the output of the amplifier 18. With this arrangement permanent records may be made simultaneously of any number of different components of the vibrations it is desired to observe as each filter may be set to pass the vibrations of a different frequency band. Additional amplifiers 84 may be inserted in any circuit for increasing the energy of the weaker vibrations.

Fig. 3 shows an arrangement similar to that shown in Fig. 2 for recording simultaneously vibrations of different ferquencies. In this modification a multi-stringed "Einthoven" galvanometer 70 such as described in the "Engineer" of August 22, 1919, page 255 is used for recording the vibrations on a photographic film or paper strip 74. 75 represents the usual light source and 76 a tuning fork generator or other convenient means for giving a time reference curve.

The apparatus herein described is especially suited for hospital use and as an aid in instructing students. During surgical operations the detector 10 may be permanently attached to the patient and the heart sounds reproduced in a loud speaker, making it unnecessary for a surgeon to rely upon an attendant for observing the heart action. All the apparatus including the batteries may be placed in any portable case, such as tea wagon type (not shown). Extension lines may be connected to the jacks 67 or in place of the receiver 19 and the body vibrations transmitted any desired distance. It facilitates instructing students as any number may listen in at the same time. The instructor may transmit remarks by talking against the body of the patient or by talking into any suitable transmitter which may be substituted for this purpose for the detector 10. In making remarks the filter should be disconnected by switch 21 in order to permit the free passage of speech vibrations. The device may also be readily connected to telephone lines for consulting with absent physicians and for the transmission of heart and chest vibrations to a central laboratory equipped to make permanent records.

If desired, filters may be used which are designed to pass any definite bands of frequencies but which may not use low pass and high pass filters. The actual number of filters disclosed herein, or the various frequency values, are not to be taken as limiting the invention, since they are given merely by way of example.

What is claimed is:

1. In stethoscopic apparatus, means adapted to be placed in contact with the body for detecting sound vibrations arising therein and translating said sound vibrations into corresponding electrical vibrations, electric filters and means for controlling said filters whereby any predetermined band of said electrical vibrations may be passed and all others suppressed, and means for translating said passed electrical vibrations into observable effects.

2. In stethoscopic apparatus, an electromagnetic detector for translating body vibrations within the sound range into corresponding electrical vibrations, means for amplifying said electrical vibrations, means for passing any predetermined band of said amplified electrical vibrations, and suppressing all other electrical vibrations outside of said band, and means for translating said passed electrical vibrations into observable effects.

3. In stethoscopic apparatus, an electrical circuit including an electromagnetic device for detecting alll sound vibrations within the body and translating said sound vibrations into electrical vibrations, an amplifier connected to said device for amplifying the electrical vibrations, a plurality of electrical filters having different frequency characteristics, switching means for combining said filters in a predetermined manner to pass certain of the amplified electrical vibrations to the exclusion of all others, a translating device for observing the amplified electrical vibrations, and switching means for connecting said filter combination in circuit between said amplifier and said translating device.

4. In a stethoscopic device, a sound detector adapted to be placed against the body for detecting sound vibrations originating therein and translating said sound vibrations into corresponding electrical vibrations, amplifiers for amplifying said electrical vibrations, a plurality of recording devices connected to the output of said amplifier, and a filter in each recording circuit, each filter having a different frequency characteristic, whereby sound vibrations of different frequencies may be recorded simultaneously and separately.

5. In stethoscopic apparatus, means for detecting body vibrations and translating said vibrations into corresponding electrical vibrations, means for amplifying said electrical vibrations, a plurality of electric filter units each adapted to suppress a different band of frequencies, a translating device, and switching means whereby any predetermined combination of said units may be connected between said amplifying means and said translating device.

6. In stethoscopic apparatus, a detector responsive to all frequencies within the range to be employed, means to amplify vibrations of all frequencies, a translating device and a plurality of filters between said amplifier and said translating device for selecting from the total range desired regions and suppressing all other regions.

7. The method of auscultation which consists in detecting simultaneously all sound vibrations arising in the body, translating said sound vibrations into electrical vibrations, amplifying said electrical vibrations, and translating into observable effects only a predetermined range of the electrical vibrations by selectively suppressing vibrations outside of the predetermined range.

In witness whereof, we hereunto subscribe our names this 28th day of May, A. D., 1924.

HAROLD F. DODGE.
HALSEY A. FREDERICK.